(No Model.) 2 Sheets—Sheet 1.
G. W. DYCUS.
AGRICULTURAL IMPLEMENT.
No. 577,946. Patented Mar. 2, 1897.
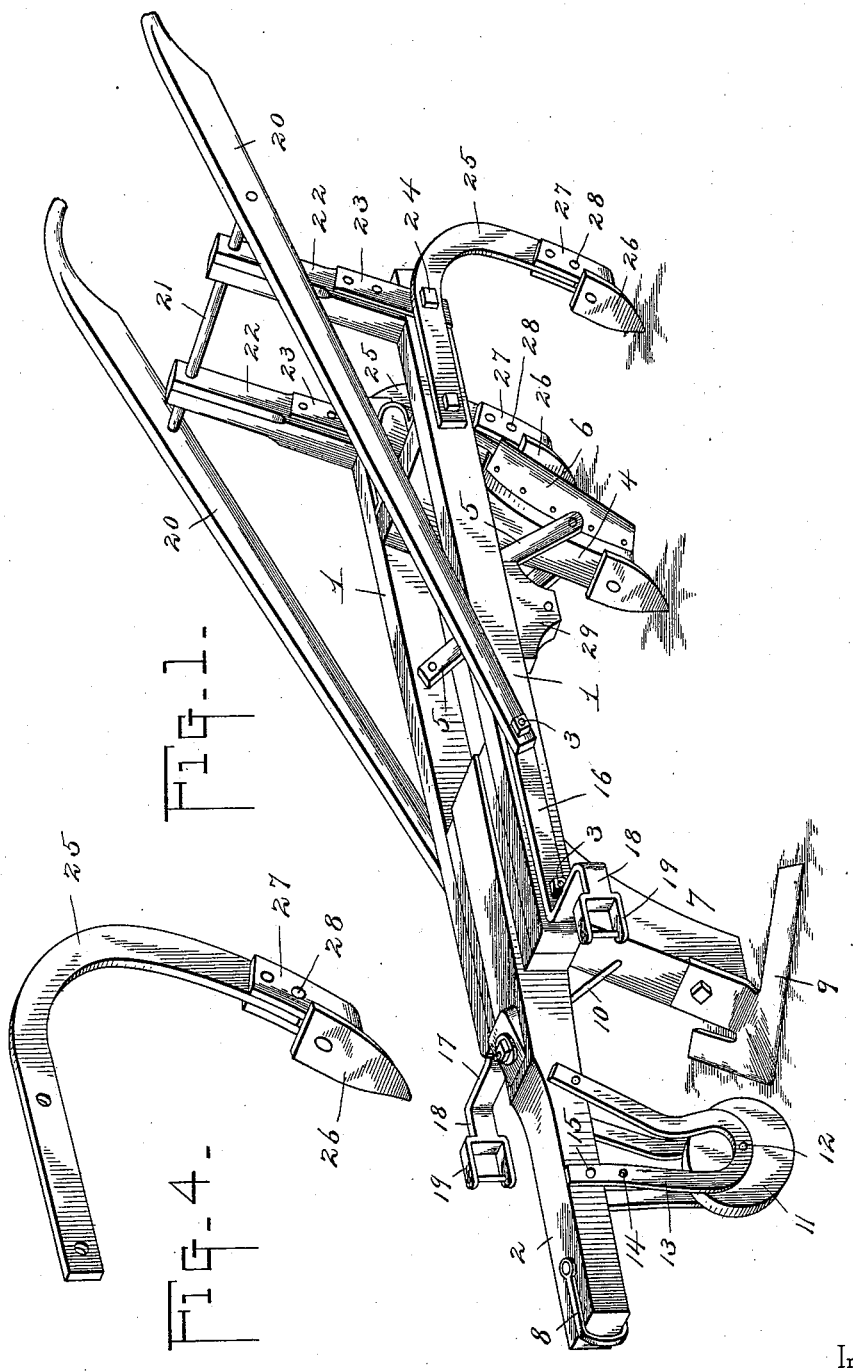
Witnesses
Harry L. Ames,
V. B. Hillyard.
Inventor
George W. Dycus.
By his Attorneys,
C. A. Snow & Co.

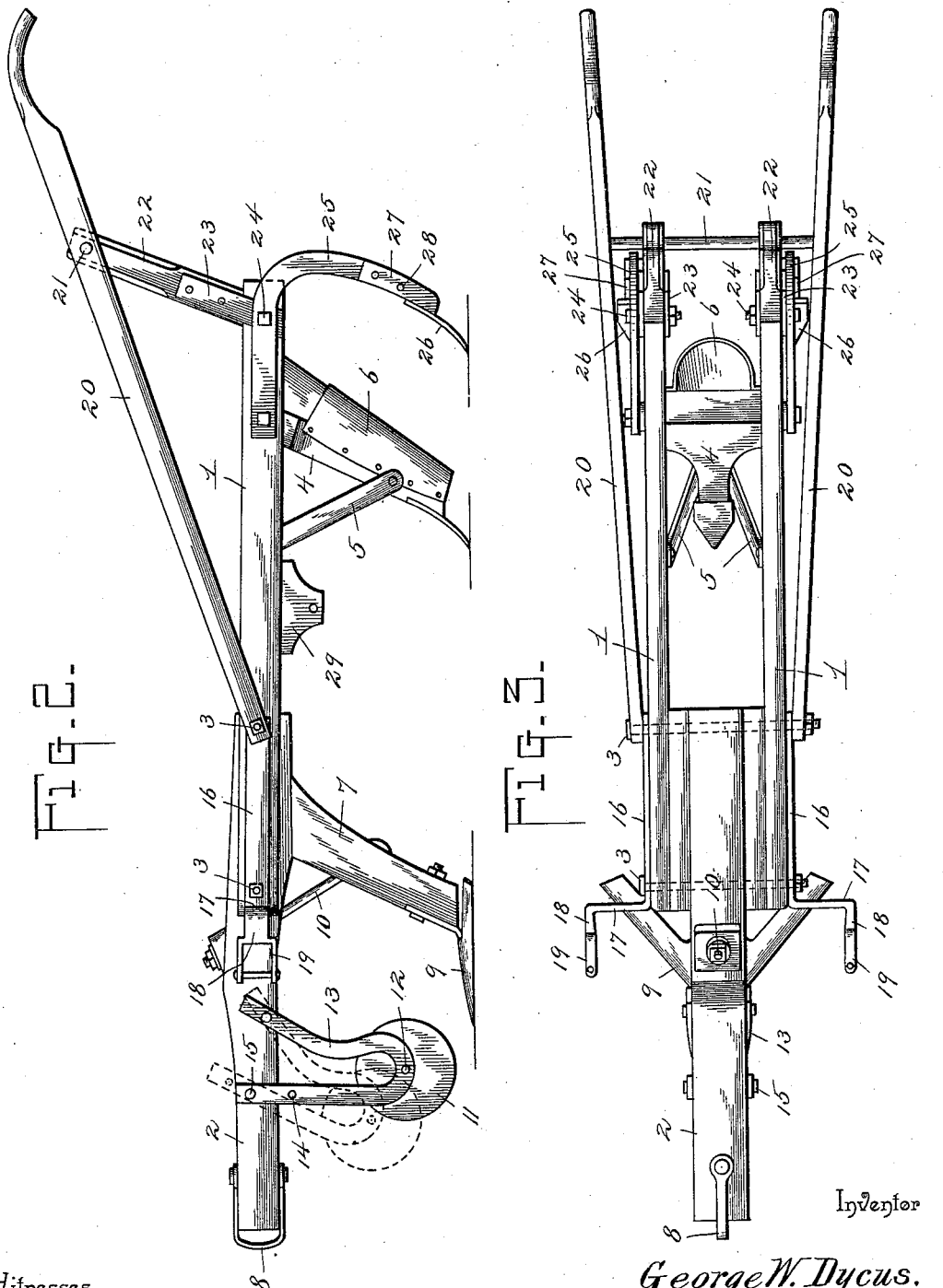

UNITED STATES PATENT OFFICE.

GEORGE W. DYCUS, OF LIBERTY HILL, TEXAS, ASSIGNOR OF ONE-HALF TO J. B. PREWITE, OF SAME PLACE.

AGRICULTURAL IMPLEMENT.

SPECIFICATION forming part of Letters Patent No. 577,946, dated March 2, 1897.

Application filed June 26, 1896. Serial No. 597,028. (No model.)

*To all whom it may concern:*

Be it known that I, GEORGE W. DYCUS, a citizen of the United States, residing at Liberty Hill, in the county of Williamson and State of Texas, have invented a new and useful Agricultural Implement, of which the following is a specification.

This invention relates to agricultural implements to be used for tilling the soil and planting, either separately or at one and the same operation, and has for its object to reduce the expense incurred by the general practice of first preparing the land for planting and subsequently sowing the seed. By this invention the land can be simultaneously prepared and the grain deposited therein. Hence labor and time are saved by the improved implement.

A further object of the improvement is to provide an implement which will admit of any form or style of planter attachment being applied thereto when required, and which is adapted to be used for walking or riding, according to the convenience of the farmer and whether the implement is to be used alone or in connection with the carriage of a wheel cultivator or plow.

For a full understanding of the merits and advantages of the invention reference is to be had to the accompanying drawings and the following description.

The improvement is susceptible of various changes in the form, proportion, and the minor details of construction without departing from the principles or sacrificing any of the advantages thereof, and to a full disclosure of the invention an adaptation thereof is shown in the accompanying drawings, in which—

Figure 1 is a perspective view of an agricultural implement especially designed for attaining the purposes of this invention. Fig. 2 is a side elevation thereof, showing an adjusted position of the gage-wheel by dotted lines. Fig. 3 is a top plan view. Fig. 4 is a detail view of a rear standard and shovel, showing the break-pin connection between the foot of the shovel and the said standard.

Corresponding and like parts are referred to in the following description and indicated in the several views of the accompanying drawings by the same reference-characters.

The frame of the implement comprises longitudinal bars 1, arranged in parallel relation and spaced a short distance apart. A stub-tongue 2 has its rear portion placed between the front end portions of the longitudinal bars 1 and held in place by suitable fastenings or bolts 3, which extend through corresponding openings in the bars 1 and stub-tongue. A stock 4 has its upper end secured between the rear ends of the longitudinal bars 1, and with the stub-tongue holds the longitudinal bars at a fixed relative distance apart. Braces 5 connect the lower end of the stock 4 with the respective longitudinal bars 1 a short distance in advance of the upper end of the said stock 4. A grain-spout 6 is provided in the rear of the stock 4 in any convenient way, and, as shown, is formed by folding a metal strip between its longitudinal edges and securing the latter to the opposite sides of the stock 4, the space thus provided between the rear of the stock and the deflected portion of the strip providing a passage for the escape of the grain to the furrow or trench formed by the opener applied to the lower end of the said stock 4.

The stub-tongue 2 has a clevis 8 at its front end and carries a stock 7 at its rear end, to the lower end of which is attached a double sweep 9, which operates in advance of the opener, so as to remove all trash, roots, and obstructing matter which would seriously interfere with the action of the opener and the proper sowing of the seed. This stock 7 is strengthened by a brace 10.

The depth of penetration of the sweep 9 into the soil is regulated by a gage-wheel 11, which is mounted upon a pin or axle 12, connecting the lower ends of substantially U-shaped pieces 13, located upon opposite sides of the stub-tongue and secured thereto at their upper ends. The rear members of the U-shaped pieces have pivotal connection with the stub-tongue and the front members have a series of openings 14, which are adapted to receive a pin or bolt 15, by means of which the said front members have adjustable connection with the stub-tongue, thereby providing for the vertical adjustment of the gage-wheel, so as to attain the object in view.

Draft-bars 16 are secured to the sides of the longitudinal bars 1 by the same bolts 3 employed for connecting the longitudinal bars and the stub-tongue together, and the front ends of these draft-bars are bent outwardly, as shown at 17, thence forwardly, as shown at 18, and terminate in forks 19, which are adapted to be bolted to the carriage of a cultivator or other wheeled implement. When the implement is to be drawn by a team of horses, the team is hitched to the clevis 8 and the pair will walk upon opposite sides of the stub-tongue.

The handles 10 are secured to the longitudinal bars by the bolt 3 and are connected near their rear ends by a cross-rod 21. Uprights 22 are secured at their lower ends between strap-irons 23, which are made fast to the rear ends of the longitudinal bars 1 by bolts 24, so as to admit of the uprights being readily removed when it is required to dispense with the use of the handles. The upper ends of the uprights are apertured and receive the cross-rod 21, thereby supporting and strengthening the said handles. When the implement is attached to the carriage of a cultivator or other wheeled implement, the handles and uprights are removed, thereby lightening the machine and obviating interference with the planting attachment.

Curved standards 25 are affixed to the rear ends of the longitudinal bars 1 and carry the covering-blades 26, the latter having connection with feet 27, which in turn have pivotal connection with the lower ends of the standards 25. Each foot 27 comprises side members which embrace the sides of the standard to which the foot is secured, and these side members and standard have openings which are adapted to register and through which passes a break-pin 28, which will part in the event of the blade 26 meeting with a root, stone, or other unyielding obstruction, so as to permit the blade to turn back and thereby obviate disabling the implement.

As previously intimated, the implement herein specified is especially designed to be used in connection with a planter attachment of any desired pattern. The hopper or seed-box will be placed so that the liberated grain will fall into the grain-spout 6 and find its way into the trench or furrow formed by the opener secured to the lower end of the stock 4. The ground-wheel for actuating the seed-dropping mechanism will be journaled in bearings 29, secured to the lower side of the longitudinal bars 1. Inasmuch as the planting mechanism is of ordinary construction and forms no part of the present invention it is not deemed necessary to illustrate any particular form in connection with the implement, since any one skilled in the use of planters can readily adapt any selected attachment to the implement without reconstructing either part.

The frame and stocks may be wood, metal, or other material, and the stock 7 may be adjustable, similar to the gage-wheel support, and the draft-bars may be removed when the implement is not connected to a cultivator or other wheeled contrivance.

Having thus described the invention, what is claimed as new is—

1. In an implement for the purposes aforesaid, the combination of longitudinal bars extending in parallel relation, a stub-tongue secured between the front ends of the longitudinal bars and bearing a sweep and gage-wheel, a stock secured between the rear ends of the longitudinal bars and having a blade at its lower end, the longitudinal bars being spaced apart by the stub-tongue and stock and connected together by the same means employed for securing the said stub-tongue and stock in place, and standards attached to the rear ends of the longitudinal bars and bearing blades substantially as set forth.

2. In an agricultural implement for the purpose aforesaid, the combination of longitudinal bars, a stub-tongue secured between the front ends of the longitudinal bars, draft-bars applied to the outer side of the longitudinal bars and having their front end portions bent outwardly, thence forwardly, and fastenings passing through corresponding openings in the draft-bars, longitudinal bars and stub-tongue and connecting them together, substantially as set forth.

3. In an agricultural implement for the purpose specified, the combination of longitudinal bars, a stub-tongue secured between the front ends of the longitudinal bars and bearing a sweep and a gage-wheel, a stock secured between the rear ends of the longitudinal bars and having an opener and a grain-spout, standards secured to the sides of the longitudinal bars and having covering-blades at their lower ends connected therewith by break-pins, handles removably fitted to the longitudinal bars, and uprights for bracing the said handles detachably connected with the rear ends of the longitudinal bars, substantially as set forth.

4. The herein-described implement, comprising longitudinal bars disposed in parallel relation, a stub-tongue having a clevis at its front end and having its rear portion inserted between the front ends of the longitudinal bars, draft-bars placed against the outer sides of the longitudinal bars and having their front ends deflected outwardly, thence forwardly, fastenings for connecting the draft-bars, longitudinal bars and stub-tongue, a stock bearing a sweep secured to the stub-tongue, a gage-wheel vertically adjustably connected with the said stub-tongue, a stock having an opening blade and a grain-spout secured between the rear ends of the aforesaid longitudinal bars, standards secured to the rear ends of the longitudinal bars and having covering-blades connected therewith by break-pins, and handles detachably connected with the longitudinal bars, substantially as and for the purpose set forth.

In testimony that I claim the foregoing as my own I have hereto affixed my signature in the presence of two witnesses.

GEORGE W. DYCUS.

Witnesses:
H. T. DAY,
H. T. BLOCKLOCK.